July 10, 1951
F. C. WILLIAMS ET AL
2,559,834
RADIO SCANNER CONTROL
Filed Aug. 5, 1947
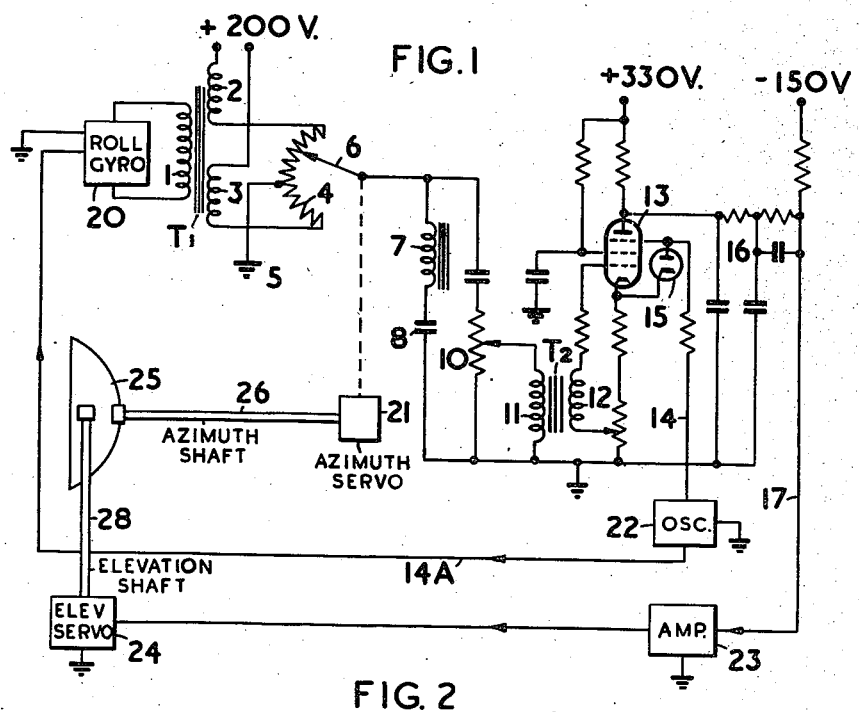
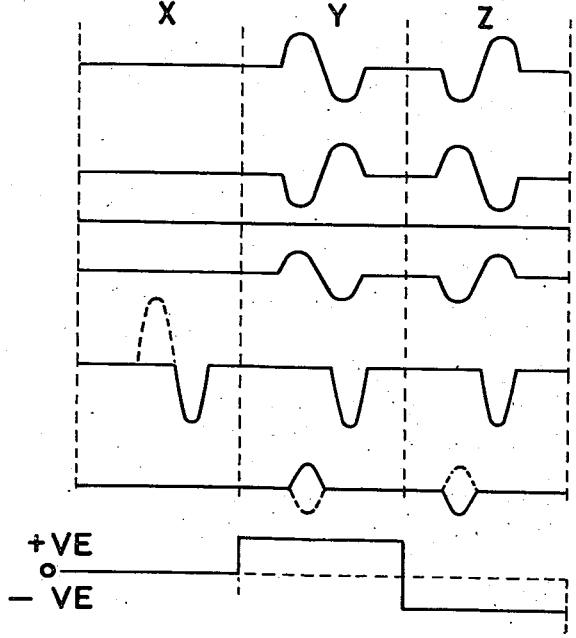
Inventor
F. C. WILLIAMS
By
Attorney Patented July 10, 1951

2,559,834

UNITED STATES PATENT OFFICE 2,559,834

RADIO SCANNER CONTROL

Frederic Calland Williams, Timperley, and Arthur I. Llewelyn, Great Malvern, England Application August 5, 1947, Serial No. 766,427
In Great Britain August 8, 1945

Section 1, Public Law 690, August 8, 1946
Patent expires August 8, 1965

8 Claims. (Cl. 343—100)

This invention relates to radio echo systems and more particularly to radio echo systems of the mechanically operated directional scanning beam type that is to say of the type in which a highly directional radio beam transmitted from a radio directional member such for example as an aerial or radio mirror, is caused repeatedly to traverse a predetermined scanning path in space by mechanically moving said member. When the beam strikes an object capable of reflecting radio waves the reflected energy is received and employed to operate an indicator indicating the presence of the said object. In some systems of this type an entirely separate receiver system is employed while in others a common aerial or its equivalent is employed both for transmission and reception. The present invention is applicable alike to both these forms of system of the type referred to.

One of the difficulties met with when a radio echo system of the type referred to is installed on shipboard or in an aircraft is that of rolling or pitching or yawing of the craft for it will be appreciated that when the ship or aircraft rolls or otherwise moves in an undesired manner the scanning beam will not follow the required predetermined path in space unless special measures are provided to ensure that it does. In general rolling is the most troublesome difficulty. It has been the usual practice hitherto to seek to avoid this difficulty by mounting the whole transmitting unit comprising not only the radio directional member itself but also its mechanical scanning gear in a frame or carrier which is gyroscopically controlled so that the directional unit and scanning gear remain substantially stationary (apart from the required scanning movements) despite roll or the like of the craft to which the apparatus is fitted. This kind of arrangement presents the practical defect that it is apt to be clumsy since the weight of the apparatus required to be gyroscopically steadied is substantial and moreover allowance must be made for substantial relative movement between the carrier frame and the gyroscopically steadied apparatus since, obviously, this relative movement is a direct and simple function of the roll or other movement of the ship or aircraft.

The present invention seeks to overcome these difficulties and to provide an improved radio echo system of the type referred to wherein compensation for rolling or the like is effected either wholly or to a desired degree of approximation by apparatus in which the weight and size of the parts to be gyroscopically steadied shall be as small as possible.

According to this invention there is provided a radio scanning apparatus in which partial or total correction for the effects of rolling or the like in a radio echo system of the type referred to is obtained by deriving a correcting component of control in dependence both upon the roll or other movement and also upon the momentary position of the scanning radio directional member with reference to a datum position along a line in a first direction, and applying said component of control to said member to deflect it in a second direction which is perpendicular to the first from its normal (uncorrected) scanning path. The essential features of the invention are fully defined in the claims which are referred to for a proper definition of the invention.

The radio directional member may take any of the known forms for example it may be a directional aerial or aerial system or a radio mirror or a so-called waveguide flare.

For the sake of simplicity in description the invention will be particularly described as applied to the correction of roll since this is in practice the major cause of trouble. It will be apparent however from the description which follows that by obvious modification the invention may be equally applied to correction of other error e. g. due to pitch.

The invention is illustrated and further described in connection with the accompanying drawings in which:

Figure 1 shows diagrammatically an embodiment of the invention suitable for use in an aircraft installation wherein partial correction for roll or bank is provided electro-mechanically.

Figure 2 is a set of curves relating to the operation of the apparatus shown in Figure 1.

Referring to Figure 1, an alternating current voltage derived from a gyro-control unit 20 and of amplitude dependent upon the roll or bank angle of the aircraft carrying the installation is fed to the primary 1 of a transformer T1 having two similar secondaries 2, 3. The secondaries 2, 3 are connected each at one end to a suitable floating source of voltage, say 200 volts and at the remaining ends to a potentiometer 4 having its centre tap earthed at 5. This potentiometer is the normally provided scanner azimuth potentiometer i. e. its slider 6 is moved back and forth to provide normal scanning action. Since the centre point is earthed at 5 the output from the slider 6 thereof will consist of sense-reversing D. C. voltage derived from the 200 volt floating source and dependent upon the momentary position of the slider 6 superimposed upon sense-reversing A. C. voltage derived from the gyro control unit via transformer T1. The slider 6 and the azimuth servo 21 are interconnected in any well known way and move synchronously back and forth to provide azimuth scanning. The A. C. component of voltage derived from the gyro unit via transformer T1 and tap 6 is fed via potentiometer 10 to the primary 11 of a transformer T2 whose secondary 12 is included in the inner control grid circuit of a valve 13. Transformer feed at T2 is employed so as to prevent those A. C. components of scanning which are due solely to the relatively slow rate of D. C. variation of the slider 6 of the azimuth scanner potentiometer from affecting the control grid of valve 13 which is thus rendered subject only to that A. C. voltage which is derived from the gyro unit. This voltage will be of amplitude proportional to the roll angle and of sense and amplitude dependent upon the instantaneous position of the slider 6 of the azimuth scanner potentiometer, being zero for all angles of roll when the slider 6 is on the centre tap i. e. when the scanning radio beam from the mirror is pointing dead ahead. The valve 13 is rendered effectively inoperative during alternate half cycles, its outer or suppressor grid being connected over lead 14 to the normally provided reference voltage oscillator 22 and a diode 15 being connected as shown to prevent the flow of suppressor grid current during positive or "operative" half cycles. The resulting voltage waveform appearing at the anode of 13 is smoothed by filter 16 and fed over line 17 to the amplifier 23 and servomotor 24 controlling the elevation of the mirror transmitting the scanning radio beam. Thus the elevation of the mirror will be controlled in dependence upon the output from 13 and this output will be a combined function of roll and of the momentary position of the beam, during scanning, with relation to its position, which is assumed to be dead ahead (slider 6 on centre tap of potentiometer 4).

Since in practice the elevation motor has to work with much more acceleration than the azimuth motor, which except at and near the ends of a scanning line, runs at constant velocity, it is of advantage to include a rate-aiding network (not shown) in the channel fed from line 17 so as to correct for the effects of inertia or lag in the elevation motor and thereby ensure that scanning will still take place over a straight line instead of "looping" i. e. scanning in such a way that the scanning path encloses an area. It will, of course, be understood that the reference voltage oscillator 22 also supplies oscillations through lead 14A to the gyro unit so that the output thereof will consist of the reference voltage oscillations at an amplitude dependent upon the angle of roll. In Fig. 1 the various voltages shown are given only by way of example.

The results obtained with the apparatus of Fig. 1, when installed on an aircraft, are shown in Fig. 2 for the three conditions of level flight (column X) starboard banked turn (column Y) and port banked turn (column Z) it being assumed that the aircraft installation is intended to scan a horizontal line forward of the aircraft and extending about 60° each side of the dead ahead position. In Fig. 2 the line 1 shows the misalignment for a certain roll angle during a complete scan i. e. the departure in columns Y and Z, from the straight horizontal line shown in column X is a measure of the amount by which (for the angle or roll considered) the scanning mirror would depart from the desired path for proper scanning, were this invention not applied. Lines 2, 3 and 4 show the correcting signal applied to the inner grid of valve 13 for the three conditions, respectively, of mirror to starboard, mirror central (beam dead ahead) and mirror to port. This signal is given by the form $f(\sin \theta - a)$ where $\theta$ is the angle of roll and $a$ is the momentary scanning angle in azimuth i. e. the angle, in azimuth, between the momentary position of the scanning mirror and the datum position (dead ahead). Line 5 of Fig. 2 shows the reference oscillation on the outer grid of the valve 13, the positive half cycle (shown dotted) being "chopped" by the diode 15. Line 6 shows the voltage on the anode of valve 13 the full line being for mirror to starboard and the dotted line for mirror to port. Line 7 of Figure 2 shows the output stabilizing signal obtained, a positive signal deflecting the mirror up and a negative signal deflecting it down. For clarity in drawing the seventh line shows the stabilising signal for the case of mirror to starboard only. For the case of mirror to port the representation would, of course, be the mirror image of that shown.

It may be shown that complete correction for roll, in the case of scanning back and forth in a horizontal line as already described, requires that the formula $$\phi = \tan^{-1}(\tan \theta \sin a)$$

be satisfied where $\phi$ is the required angular correction in elevation, $\theta$ is the roll angle and $a$ is the momentary scanning angle i. e. the angle between the beam and the datum scan position. In practice, however, sufficiently good practical results can be obtained by an apparatus, such as that illustrated in Fig. 1, which satisfies the equation $$\phi = K \sin \theta \frac{\alpha}{\alpha_0}$$

where $a_0$ is the limiting angle between the scanning beam at the extreme end of a scan and the datum scan position and K is a constant. In the apparatus of Fig. 1 the constant K can be adjusted (to provide best results for any given condition) by adjusting the tap on the potentiometer 10 i. e. K is, in effect, a gain control constant. It will be appreciated that the larger value of $a$ the less perfect is the correction for roll but the satisfaction of the equation adopted for the apparatus of Fig. 1 is considerably simpler, practically, than the satisfaction of the theoretical equation first given herein and it is considered well worth while to forego theoretical perfection of correction in the interests of simplicity of design and absence of electrical complexity.

We claim:

1. Radio scanning apparatus for a moving craft comprising a radio directional member, means adapted to drive said radio directional member in a first direction to perform a desired scanning motion, second means adapted to drive said radio directional member in a predetermined direction, substantially at right angles to said first direction, means for obtaining a voltage dependent on variations in the angular position of the craft about the mean position of the scanning beam, means for modulating said voltage in accordance with the momentary position of said radio directional member in its scanning motion with respect to a datum position to obtain a correcting voltage, and means for feeding said correcting voltage to said second means to control the position of the radio directional member in said predetermined direction to correct for said undesired displacement.

2. Radio scanning apparatus for a moving craft comprising a radio directional member, scanning means to drive said radio directional member in a first direction to perform a desired scanning motion, a second means adapted to drive said radio directional member in a second direction substantially at right angles to said first direction, a potentiometer having a slider thereon, means to move said slider in synchronism with the scanning motion of said radio directional member, means for obtaining an error voltage dependent on variations in the angular position of the craft about the mean position of the scanning beam, means for applying said error voltage across said potentiometer, means for obtaining from the slider of said potentiometer a correcting voltage, and means for feeding said correcting voltage to said second means to control the position of said radio directional member to thereby correct for said undesired displacement.

3. Radio scanning apparatus comprising a radio directional member, a first motor adapted to drive said radio directional member in a first direction, a second motor adapted to drive said radio directional member in a second direction substantially at right angles to said first direction, a potentiometer having a slider thereon and having a direct current source of voltage applied thereto, means for moving said slider in synchronism with said first motor, for driving said first motor in accordance with the resultant slowly varying direct current voltage on said slider and thus cause said radio directional member to perform a direct scanning motion, position-sensitive means for obtaining an alternating current voltage representative of an undesired displacement of said radio directional member in said second direction, means for applying said alternating current voltage across said potentiometer, and means for driving said second motor in accordance with the resultant alternating current voltage on said slider to thereby correct for said undesired displacement.

4. In radio scanning apparatus for use on a craft, a scanning element for projecting a radio beam and for moving the beam about a mean position; a source of a reference alternating current voltage of a first frequency; a device having an output responsive to the angle of rotary deflection of the craft about an axis that coincides with said mean position to vary said voltage in magnitude depending on said angle; a potentiometer having a grounded center tap and also having a movable slider; means for applying the output of said device across said potentiometer; means for passing a direct current through said potentiometer; means connected to said slider for oscillating the slider at a second frequency different from and of a lower order of magnitude than the first frequency and also oscillating the scanning element in synchronism with the slider and in a plane that is fixed with reference to the craft; a transformer having a primary connected to and energized by the potential of said slider; said transformer including means to readily transform said first frequency without transforming the second frequency; an electron discharge device having a cathode, a control grid, a further grid, and an anode; said transformer including a winding having its terminals connected between said cathode and said control grid; a source of direct current potential connected between said cathode and anode with the positive terminal of said source connected to the anode; means connected to said source of reference voltage and also connected to said further grid to block said electron discharge device during alternate half cycles of said reference voltage; a motor for driving said scanning element in a second direction that is perpendicular to said plane; and an output circuit for controlling said motor according to variations in anode-cathode current flow, said output circuit including a filter having its input connected to the anode-cathode circuit and having its output connected to said motor.

5. A craft having the apparatus of claim 1 mounted thereon, in which said direction is fixed with respect to the craft, and in which the first-named means of claim 1 comprises a device for producing a voltage which varies with the angle of roll of the craft.

6. A craft having the apparatus of claim 2 mounted thereon, in which said directions are fixed with respect to the craft, and in which the second-named means of claim 2 comprises means for producing a voltage that varies with the angle of roll of the craft.

7. A craft having the apparatus of claim 3 mounted thereon, in which said motors drive said member at different fixed angles respectively with respect to the craft, and in which the position sensitive means of claim 3 comprises means for varying the alternating current voltage thereof according to departures of the craft from a normal level position.

8. In a radio scanning system for use on a moving craft, a directional antenna, scanning means for rotating said antenna, said scanning means including control means for rotating the antenna about an axis having a predetermined fixed relationship to the craft when the craft is moving in a normal level position, and means for varying the axis of rotation of the antenna with respect to the craft to correct for rotation of the craft about the mean position of the radiated beam from the antenna, the last-named means including means synchronized with motion of said antenna about the axis of rotation of the antenna and also responsive to the rotation of the craft about the mean position of the radiated beam from said antenna for moving the axis of rotation of the antenna by amounts varying with both the rotation of the craft about said mean position and the angular position of the antenna about said axis.

FREDERIC CALLAND WILLIAMS.
ARTHUR I. LLEWELYN.

REFERENCES CITED

The following references are of record in the file of this patent:

UNITED STATES PATENTS

| Number | Name | Date |
| --- | --- | --- |
| 2,414,108 | Knowles et al. | Jan. 14, 1947 |
| 2,415,679 | Edwards et al. | Feb. 11, 1947 |
| 2,415,680 | Hoyt | Feb. 11, 1947 |
| 2,417,086 | Proskauer et al. | Mar. 11, 1947 |
| 2,426,658 | Wooldridge | Sept. 2, 1947 |
| 2,458,175 | Kolding | Jan. 4, 1949 |
| 2,499,228 | Norden | Feb. 28, 1950 |